United States Patent [19]

Rosenberg

[11] Patent Number: 4,492,726
[45] Date of Patent: Jan. 8, 1985

[54] HIGH WET STRENGTH WAFERBOARD

[75] Inventor: George N. Rosenberg, British Columbia, Canada

[73] Assignee: MacMillan Bloedel Limited, Vancouver, Canada

[21] Appl. No.: 504,869

[22] Filed: Jun. 16, 1983

Related U.S. Application Data

[63] Continuation-in-part of Ser. No. 388,977, Jun. 16, 1982, abandoned.

[51] Int. Cl.³ .............................................. B32B 23/02
[52] U.S. Cl. ................................ 428/192; 428/194; 428/213; 428/215; 428/326; 428/352; 428/535; 428/541; 428/531; 156/62.2
[58] Field of Search ........................................ 428/485

[56] References Cited

U.S. PATENT DOCUMENTS

| | | |
|---|---|---|
| 2,773,790 | 12/1956 | Clark . |
| 2,786,005 | 3/1957 | Clark et al. . |
| 3,164,511 | 1/1965 | Elmendorf . |
| 4,053,339 | 10/1977 | Story et al. ........................ 428/326 |
| 4,061,823 | 12/1977 | McCaskey ......................... 428/326 |
| 4,158,713 | 6/1979 | Degens ............................... 428/326 |
| 4,241,133 | 12/1980 | Lund et al. ........................ 428/326 |
| 4,246,310 | 1/1981 | Hunt et al. ........................ 428/326 |
| 4,361,612 | 11/1982 | Shaner et al. ..................... 428/326 |
| 4,364,984 | 12/1982 | Wentworth ........................ 428/326 |
| 4,404,252 | 9/1983 | Hetzler et al. .................... 428/326 |

FOREIGN PATENT DOCUMENTS

| | | |
|---|---|---|
| 565840 | 11/1958 | Canada . |
| 597584 | 5/1960 | Canada . |
| 711688 | 6/1965 | Canada . |

OTHER PUBLICATIONS

Lei and Wilson, "Fracture Toughness of Oriented Flakeboard", *Wood Science*, vol. 12, No. 3, Jan. 1980, pp. 154–161.
Lei and Wilson, "A Model for Predicting Fracture Toughness of Flakeboard", *Wood Science*, vol. 13, No. 3, Jan. 1981, pp. 151–156.
H. D. Turner, "Effect of Particle Size and Shape on Strength and Dimensional Stability of Resin-Bonded Wood-Particle Panels", Journal of FPRS, pp. 210–223, Oct. 1954.
T. M. Maloney–"Modern Particleboard of Dry Process Fiberboard Manufacturing", Published 1977 by Miller Freeman Publications, pp. 185–203.
K. Walter, J. Kieser & T. White, "Effect of Chip Size on Some Strength Properties of Oriented Structural Board", Holz als Roh-und Werkstoff, 37, 1979, pp. 183–188.

*Primary Examiner*—Patricia C. Ives
*Attorney, Agent, or Firm*—Banner, Birch, McKie & Beckett

[57] ABSTRACT

A high wet strength waferboard panel is disclosed made from aspen species of wood flakes or equivalent with average specific gravity less than 0.6 and having wet strength equivalent to plywood. At least a portion of the wood wafers are oriented generally in a lengthwise direction such that the length to width strength ratio of the panel, measured as modulus of rupture, is in the range of about 1.3:1 to 2:1, the density of the waferboard panel being in the range of about 38 to 45 lb/ft³, the content of adhesive resin in the panel being in the range of about 4% to 10%, the content of wax in the panel being in the range of about 1% to 2½% and the thickness of the panel being in the range of about ⅝ to 1½ inches. The fully soaked panel having a moisture content of at least about 30% with an MOR lengthwise greater than about 2900 lb/in² and an MOE lengthwise greater than about $0.9 \times 10^6$ lb/in².

16 Claims, 2 Drawing Figures

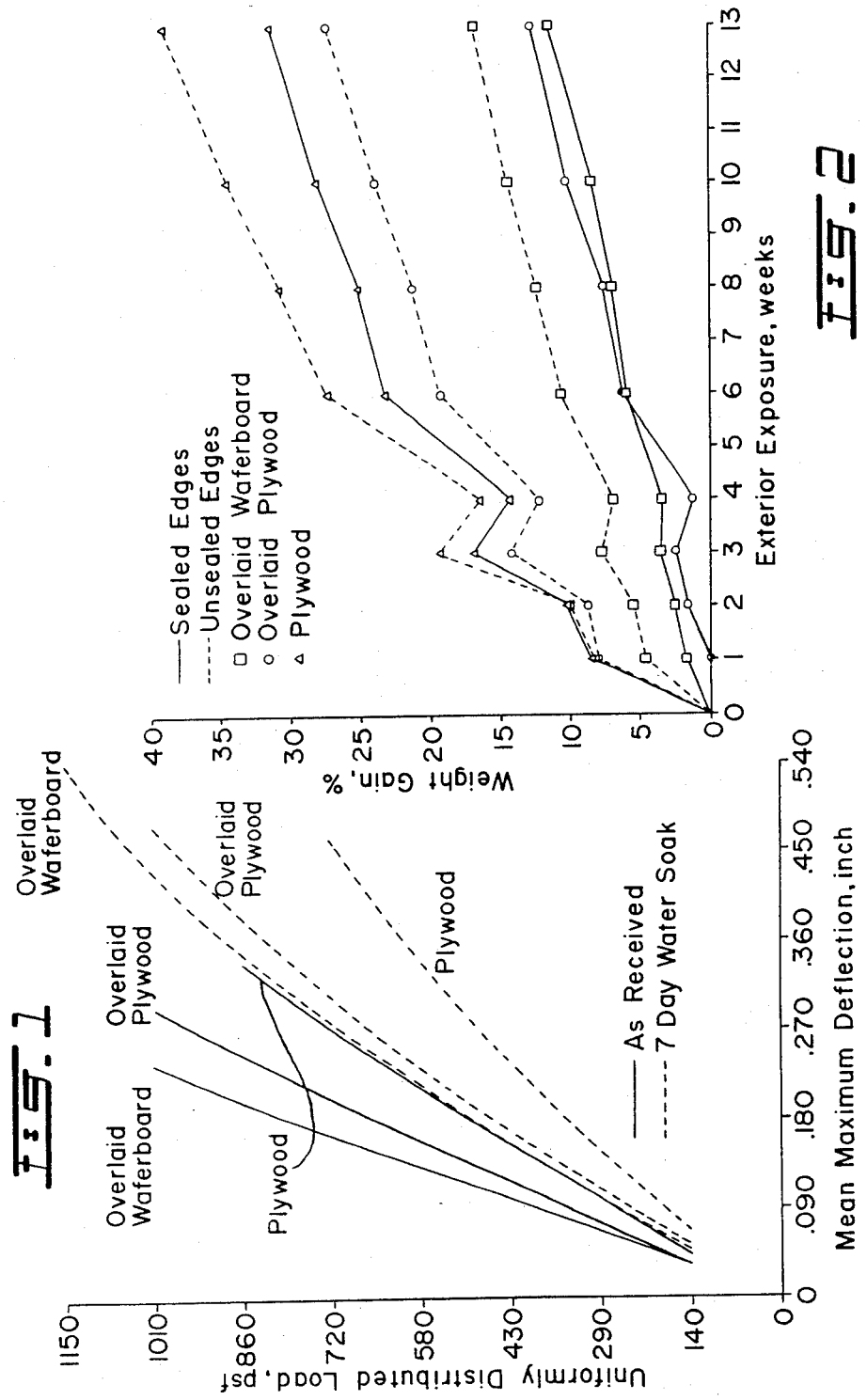

HIGH WET STRENGTH WAFERBOARD

This application is a continuation-in-part of application Ser. No. 388,977 filed on June 16, 1982, now abandoned.

This invention relates to waferboard. More particularly the invention relates to a high wet strength waferboard product which has higher density and better durability than existing kinds of waferboard, and has load carrying capacity and stiffness properties equivalent to plywood.

Waferboard is made from wood wafers which are blended with an adhesive resin and wax and formed into mats which are pressed at high temperature to cure the adhesive resin and produce the final waferboard product.

Waferboard is used in a variety of applications for which plywood has traditionally been used such as flooring, roofing and cladding. Waferboard has certain advantages in these applications since it is more economical to make than plywood and unlike plywood can be made predominantly from aspen species hardwoods which are commonly regarded as weed species by the lumber industry.

According to the Wood Handbook No. 72 issued by the Forest Products Laboratory of the U.S. Department of Agriculture, revised edition August 1974, the average specific gravity of aspen species is from 0.35 to 0.39. These specific gravity figures are based on oven dry weight and volume at 12% moisture content. Other wood species which are often mixed with aspen in the production of waferboard include paper birch, having a specific gravity in the range of 0.48 to 0.55, and balsam poplar having a specific gravity in the range of 0.31 to 0.35. In some countries softwoods such as southern pine species, having a specific gravity in the range of 0.35 to 0.4 may also be used for waferboard production. In general it can be stated that the most common wood species used for producing general waferboard products have specific gravities below 0.6.

Most types of general waferboard products have somewhat lower load carrying capacity and stiffness properties compared to plywood and this has precluded their use in certain applications for which plywood has been used traditionally. Furthermore, most waferboards do not have good wet strength properties. An example of an application requiring high wet strength properties is concrete form panels used in the fabrication of poured concrete work to retain the concrete mix in the desired shape prior to hardening. Most waferboards lack the stiffness necessary to resist deflection and retain their planar shape at the loadings and support spacings commonly required in concrete form work, and for this reason are not used. The term stiffness is here taken as a measure of the loading necessary to cause a given deflection in a panel.

Certain types of waferboards are made from dense hardwood wafers having specific gravities greater than 0.6. Wood species having these higher specific gravities include some of the oaks and hickories. Hunt et al. in U.S. Pat. No. 4,246,310 and Shaner et al. in U.S. Pat. No. 4,361,612, both disclose a structural board made from dense hardwood wafers having specific gravities greater than 0.6. Hunt defines a structural board with a specific gravity less than that of the wood species from which it is made. Whereas by using these denser starting materials one may be able to obtain high strength boards, it has been found that a high strength board can be produced using abundant, less dense woods such as aspens, balsam poplar and paper birch.

It has been found that a waferboard panel can be made from wood wafers having a specific gravity less than 0.6 with wafers oriented preferentially along the length of the panel and with increased resin content, density and thickness compared to regular waferboard. The density of the waferboard panel is greater than that of the wood species from which it is made. Surprisingly, such a waferboard has wet strength and stiffness properties in some cases better than plywood, load carrying capacity at least equal to plywood of similar thickness and greatly reduced moisture absorbency.

The waferboard panel of the present invention preferably has a coated paper overlay applied to one surface. The overlay allows the panel to be reused in concrete pouring. In tests the panel has proved to be at least as good as plywood and has stood up to many different pouring operations.

The present invention provides a waferboard panel comprising wood wafers having an initial average specific gravity based on oven dry weight with volume at 12% moisture content of less than about 0.6. adhesive resin in the range of about 4% to 10% by weight of the wood wafers, wax of about 1% to 2-$\frac{1}{2}$% by weight of the wood wafers, at least a portion of the wood wafers being oriented generally in a lengthwise direction, such that the length to width strength ratio of the waferboard panel, measured as modulus of rupture, is in the range of about 1.3:1 to 2:1, the waferboard panel have a density in the range of about 38 to 45 lb/ft$^3$, the fully soaked waferboard panel having a moisture content of at least about 30%, with an MOR lengthwise greater than about 2900 lb/in$^2$ and an MOE lengthwise greater than about $0.9 \times 10^6$ lb/in$^2$, and the waferboard panel having a weight gain of not more than about 14% after a ten week exterior exposure.

In an embodiment of the invention the thickness of the waferboard panel is in the range of about $\frac{5}{8}$ to 1 inch, preferably 13/16 of an inch, the waferboard panel after a seven day water soak has a load carrying capacity lengthwise of at least about 4800 lb in/ft, stiffness lengthwise being at least about 500,000 lb in$^2$/ft, shear modulus being at least about 9500 lb/in$^2$ and mean maximum deflection of not more than about 0.27 inch at a uniformly distributed load of 720 lb/ft$^2$ over a 24 inch support spacing.

In another embodiment of the invention, surface layers of wood wafers on both surfaces of the panel are oriented generally in a lengthwise direction, and at least one core layer between the surface layers has wafers randomly oriented. The thickness of each of the surface layers is in the range of about 14% to 33% of the board thickness and as a preferred embodiment is 20% of the panel thickness.

In other embodiments of the invention, an edge sealer is applied to all edges of the panel so the waferboard panel has a weight gain of not more than about 8% after a ten week exterior exposure and a phenolic impregnated paper overlay is applied to at least one surface of the panel; the overlay may subsequently be coated with a release agent to enhance separation between poured concrete and the panel. In preferred embodiments, the wafers are 3 inches long and the panel density is about 41 lb/ft$^3$, or 1-$\frac{1}{2}$ inches long with the panel density being about 45 lb/ft$^3$.

In drawings which illustrate the embodiments of the invention, FIG. 1 is a graph of uniformly distributed load tests comparing waferboard of the present invention with plywood.

FIG. 2 is a graph of weight gain due to exterior exposure comparing waferboard of the present invention with plywood.

The starting materials include wafers made from wood species having a specific gravity less than 0.6. Aspen, both trembling and large tooth varieties, balsam poplar and paper birch, are examples of hardwood species suitable for waferboard of the present invention. In the softwoods, southern pine is a suitable species.

Oriented waferboard has been made in the past. However, to produce the panel of the present invention, one must combine certain parameters in such a way that the required stiffness and load carrying capacity for a water soaked panel are achieved. A waferboard is made by forming a mat in a number of layers, the two outer layers are known as the surface layers and the inner layers are the core layers. Wafer orientation is achieved by a number of methods, one suitable method is disclosed in Canadian Pat. No. 597,941 which utilizes a grid and a vibrator to lay wafers in an oriented mat. We have found that if the wafers in at least the surface layers are generally oriented we can achieve the load carrying capacity and stiffness properties we need. The layers can be varied in thickness. In one process there are five formers in a waferboard line, two for forming surface layers and three for forming core layers. A preferred product has each surface layer having a thickness of about 20% of the total thickness. The core layers may be randomly oriented or transversely oriented to ensure at least a reasonable strength across the width of the panel.

The length to width strength ratio of the waferboard panel is governed by the degree of wafer orientation, the higher the orientation, the higher the ratio. It is not necessary that all the wafers throughout the board thickness should be oriented. When the wafers in the surface layers or outer layers are oriented, each of these layers generally represents a range of about 14% to 33% of the panel thickness.

In normal waferboard the adhesive resin content is around 2% to 3% by weight and the wax content is around 1% to 2% by weight. We have found that an adhesive resin content of about 4% to 10% by weight and a wax content of about 1% to 2-½% by weight gives us the wet strength requirements provided all the other parameters are met. The resin can be applied to the wafers in liquid form, in powder form or in a combination of liquid and powder. The combination of increased resin content, high density, edge sealer and overlay results in less moisture absorption in the panel than in plywood. The density of the waferboard panel of the present invention is higher than the specific gravity or density of the starting wood wafers and higher than plywood or normal waferboard panels to provide improved mechanical properties. In this application the starting wood wafers are given in specific gravity ratios and the wood panels are indicated in density terms of lb/ft$^3$.

The panel density is in the range of about 38 to 45 lb/ft$^3$. Panel density is controlled by the compression force when the layers of wafers are pressed in a hot press to cure the resin and form the panel. The higher the compression force in the press, the higher the density of the panel.

The higher density of the panel imparts improved wearing properties to the surface which is particularly useful for reusable panels for concrete pouring. A phenolic impregnated paper overlay which may subsequently be coated to enhance separation between the panel and concrete may be applied to at least one surface of the panel and edge sealing can be applied to all edges of the panel to reduce moisture absorption of the panel. A suitable high density overlay sheet is sold by Reichhold under the trademark Plyocite HDO. Panels with this overlay sheet were used in concrete pouring trials 25 times and were still reusable.

To achieve the necessary loading of panels with minimum deflection over given support spacing, the thickness of the waferboard panel is within the range of about 5/8 to 1 inch and preferably the thickness is 13/16 of an inch. Panels may be made in thicknesses from ⅜ up to 1-½ inches having the same fully soaked MOE and MOR properties as the 13/16 inch thick panels.

The fully soaked panel has a higher shear modulus than comparable plywood to give improved properties for short spans. Tests carried out have shown that the length to width strength ratios in a panel are in the range of about 1.3:1 to 2:1. The wet strength properties of the waferboard panels, when fully soaked, having a moisture content of at least 30%, provide an MOR lengthwise greater than 2900 lb/in$^2$ and an MOE lengthwise greater than $0.9 \times 10^6$ lb/in$^2$. To achieve these figures the MOE and MOR values of the panels in the dry state have to be considerably higher as the values drop between about 20% to 30% between dry strengths and wet strengths.

The waferboard panels have a weight gain due to moisture absorption when exposed to outside weather conditions. This weight gain is considerably reduced when edge sealing is applied to the panel edges.

After a seven day water soak, waferboard panels within the thickness range of ⅜ to 1 inch have a moisture content of over 20%. The panels have a load carrying capacity lengthwise of at least about 4800 lb in/ft, a stiffness lenthwise of at least about 500,000 lb in$^2$/ft. a shear modulus of at least about 9500 lb/in$^2$ and a mean maximum deflection of not more than about 0.27 inches at a uniformly distributed load of 720 lb/ft$^2$ over a 24 inch support spacing.

Waferboard panels were made 13/16 of an inch thick from wafers 1-½ inches long, random widths between 1/8 and 1-½ inches and 0.025 inch thick with a resin content of 6%, a wax content of 2.3%, and pressed to a density of 45 lb/ft$^3$. The wafers had an average slenderness ratio of about 60:1. The wood wafers were produced on a waferizer from debarked aspen roundwood with small quantities of birch and poplar mixed with the aspen.

Tests were carried out and Table I below shows a comparison of physical and structural properties between overlaid waferboard of the present invention and plywood concrete form panels, overlaid and plain. The tests show properties as received, after a seven day soak and fully soaked. The wet strength properties of the waferboard panel after the seven day soak and fully soaked are superior to existing types of waferboard and comparable if not better than plywood.

TABLE I

| | Overlaid Waferboard (13/16") | Overlaid Plywood (11/16") | Plywood (¾") |
|---|---|---|---|
| Panel Moisture Content, % | | | |
| as received | 1.9 | 6.5 | 7.1 |
| 7 day soak | 25.4 | 21.2 | 30.9 |
| fully soaked | 33.8 | — | — |
| Load Carrying Capacity, lb.in/ft (lengthwise) | | | |
| as received | 5,195 | 5,520 | 5,140 |
| 7 day soak | 4,825 | 4,930 | 3,980 |
| fully soaked | 3,880 | — | — |
| Stiffness, 1000 lb.in²/ft (lengthwise) | | | |
| as received | 618 | 489 | 514 |
| 7 day soak | 524 | 462 | 548 |
| fully soaked | 492 | — | — |
| Shear Modulus, lb/in² | | | |
| as received | 27,890 | 16,530 | 11,850 |
| fully soaked* | 9,930 | 7,950 | 5,070 |

*Vacuum/pressure treatment used to ensure that moisture content exceeded fiber saturation point.

Post-flexure tests were carried out on the 13/16 inch waferboard panels and the MOE and MOR calculated according to ASTM D3043, Method C. The average results are illustrated in Table II. The results compare overlaid waferboard of the present invention with plywood concrete form panels, overlaid and plain. The waferboard properties were tested in a fully soaked condition which produced a moisture content of greater than 30%.

TABLE II

| | Overlaid Waferboard (13/16") | Overlaid Plywood (11/16") | Plywood (¾") |
|---|---|---|---|
| **Original Thickness,* inch** | | | |
| as received | .820 | .700 | .739 |
| 7 day soak | .812 | .692 | .737 |
| fully soaked | .795 | — | — |
| MOE × 10⁶, lb/in² (lengthwise) | | | |
| as received | 1.15 | 1.42 | 1.27 |
| 7 day soak | 0.97 | 1.39 | 1.37 |
| fully soaked | 0.92 | — | — |
| MOR, lb/in² (lengthwise) | | | |
| as received | 3940 | 5610 | 4700 |
| 7 day soak | 3655 | 5140 | 3670 |
| fully soaked | 2940 | — | — |

*Original panel thickness prior to conditioning was used in calculating MOR and MOE.

The results of a uniformly distributed load test are illustrated graphically in FIG. 1. The test was carried out with support spacing of 24 inches with panels continuous over two spans. Overlaid waferboard samples of the type tested in Tables I and II were compared with plywood and overlaid plywood as received and after a seven day water soak. As illustrated the waferboard of the present invention had less deflection than the plywood.

The weight gain of the overlaid waferboard was compared against plywood as shown in FIG. 2 with sealed edges and unsealed edges. The weight gain of the overlaid waferboard is at least as good as the overlaid plywood for exposures up to 13 weeks. The weight gain for waferboard panels with unsealed edges for a ten week period of exterior exposure is about 14%. When the edges are sealed, the weight gain is only about 8%.

In another embodiment, a waferboard panel 13/16 of an inch thick was made of wafers 3 inches long with an average slenderness ratio of 120:1. Wafers from debarked aspen were mixed with small quantities of poplar and birch and compressed to a density of 41 lb/ft³. The strength properties of this board were substantially the same as those of the board made with wafers 1-½ inches long.

The embodiments of the invention in which an exclusive property or privilege is claimed are defined as follows:

1. A waferboard panel comprising wood wafers having an initial average specific gravity based on oven dry weight with volume at 12% moisture content, of less than about 0.6, said wood wafers having a length of at least about 1.5 inches and a width in the range of about 0.125 to 1.5 inches, adhesive resin in the range of about 4% to 10% by weight of the wood wafers, at least a portion of the wood wafers being oriented generally in a lengthwise direction, such that the length to width strength ratio of the waferboard panel, measured as modulus of rupture, is in the range of about 1.3:1 to 2:1,
   the waferboard panel having a density in the range of about 38 to 45 lb/ft³,
   the fully soaked waferboard panel having a moisture content of at least about 30%, with an MOR lengthwise greater than about 2900 lb/in² and an MOE lengthwise greater than about $0.9 \times 10^6$ lb/in²,
   and the waferboard panel having a weight gain of not more than about 14% after a ten week exterior exposure.

2. The waferboard panel according to claim 1 having a thickness in the range of about ⅝ to 1 inch,
   the waferboard panel after a seven day water soak having a load carrying capacity lengthwise of at least about 4800 lb in/ft, stiffness lengthwise being at least about 500,000 lb in²/ft, shear modulus being at least about 9500 lb/in² and mean maximum deflection of not more than about 0.27 inches at a uniformly distributed load of 720 lb/ft² over a 24 inch support spacing.

3. The waferboard panel according to claim 2 having a thickness of about 13/16 of an inch.

4. The waferboard panel according to claim 2 wherein the surface layers are formed on both surfaces of the panel having wood wafers oriented generally in a lengthwise direction and at least one core layer between the surface layers has wood wafers randomly oriented therein.

5. The waferboard panel according to claim 4 wherein the surface layers are each in the range of about 14% to 33% of the panel thickness.

6. The waferboard panel according to claim 2 wherein edge sealing is applied to all edges of the panel and the waferboard panel has a weight gain of not more than about 8% after a ten week exterior exposure.

7. The waferboard panel according to claim 2 including a phenolic impregnated paper overlay applied to at least one surface of the panel.

8. The waferboard panel according to claim 7 wherein the paper overlay is coated with a release agent.

9. The waferboard panel according to claim 2 wherein the wood wafers are about 3 inches long and the density of the waferboard panel is about 41 lb/ft³.

10. The waferboard panel according to claim 2 wherein the wood wafers are about 1-½ long and the density of the waferboard panel is about 45 lb/ft$^3$.

11. The waferboard panel according to claim 4 wherein the surface layer at each surface of the panel is about 20% of the total thickness of the panel.

12. A waferboard panel comprising wood wafers predominantly of aspen species hardwoods, said wood wafers having a length of at least about 1.5 inches and a width in the range of about 0.125 to 1.5 inches, at least a portion of the wood wafers being oriented generally in a lengthwise direction such that length to width strength ratio of the waferboard panel, measured as modulus of rupture, is in the range of about 1.3:1 to 2:1, the density of the waferboard panel being in the range of about 38 to 45 lbs/ft$^3$, the content of adhesive resin in the waferboard panel being in the range of about 4% to 10%, and the thickness of the panel being in the range of about ½ to 1-½ inches.

13. The waferboard panel according to claim 12 having a thickness of about 13/16 of an inch, the waferboard panel after a seven day water soak having a load carrying capacity lengthwise of at least about 4800 lb in/ft$^3$, stiffness lengthwise being at least about 500,000 lb in$^2$/ft, shear modulus being at least about 9500 lb/in$^2$, mean maximum deflection of not more than about 0.27 inches at a uniformly distributed load of 720 lb/ft$^2$ over a 24 inch support spacing and the waferboard panel having a weight gain of not more than about 14% after a ten week exterior exposure.

14. The waferboard panel according to claim 1 wherein wax in the range of about 1% to 2-½% by weight of the wood wafers is added.

15. The waferboard panel according to claim 1 wherein said wood wafers have a length in the range of about 1.5 to 3 inches.

16. The waferboard panel according to claim 12 wherein said wood wafers have a length in the range of about 1.5 to 3 inches.

* * * * *